United States Patent [19]

Jacobellis et al.

[11] 4,364,416

[45] Dec. 21, 1982

[54] LOW COST ACCUMULATOR DEVICE

[75] Inventors: A. A. Jacobellis, Woodland Hills; Abduz Zahid, Los Angeles, both of Calif.

[73] Assignee: VSI Corporation, Pasadena, Calif.

[21] Appl. No.: 305,522

[22] Filed: Sep. 25, 1981

[51] Int. Cl.$^3$ .............................................. F16L 55/04

[52] U.S. Cl. ...................................... 138/30; 220/85 B

[58] Field of Search .................. 138/26, 30; 220/85 B

[56] References Cited

U.S. PATENT DOCUMENTS

| | | | |
|---|---|---|---|
| 2,401,792 | 6/1946 | Overbeke | 138/30 |
| 2,851,059 | 9/1958 | Lucien | 138/30 |
| 3,003,522 | 10/1961 | Rohacs | 138/30 |
| 3,195,577 | 7/1965 | Greer | 138/30 |
| 3,230,976 | 1/1966 | Mercier | 138/30 |

*Primary Examiner*—James E. Bryant, III

*Attorney, Agent, or Firm*—Arthur B. Colvin

[57] ABSTRACT

The present invention is directed to an accumulator device and more particularly to an accumulator device having a spherical reservoir chamber which is preferably formed by hydraulic distension of a shell. A casing, bladder, and mounting fixture are combined with the shell by a metal forming operation to thus provide an efficient accumulator with a minimum of forming operations.

4 Claims, 1 Drawing Figure

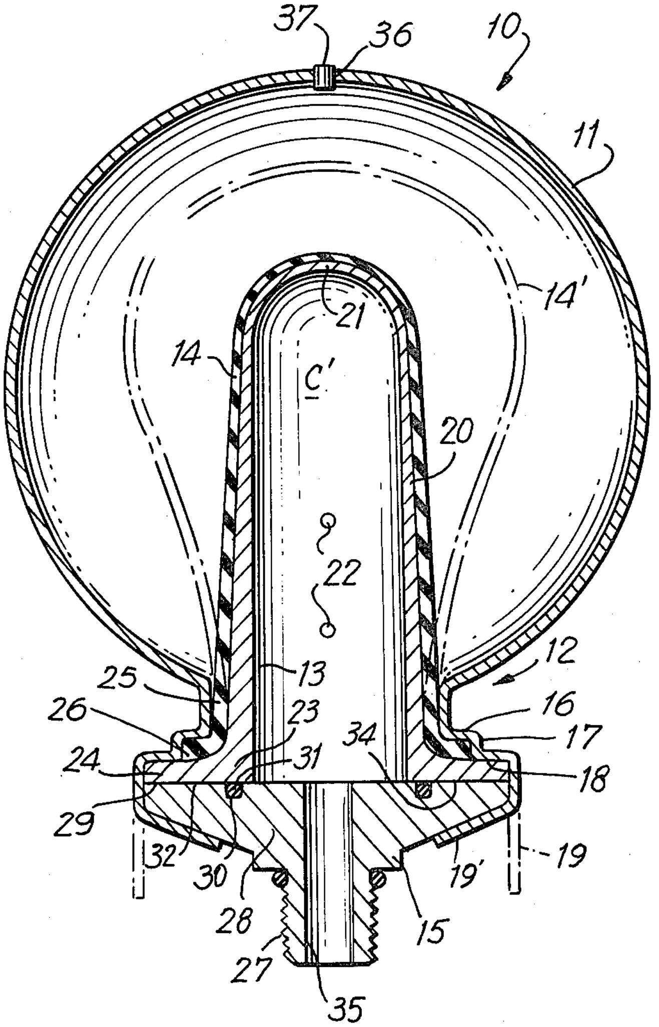
37
36
10
11
14'
21
14
C'
20
22
12
25
13
16
26
23
17
24
31
34
18
29
32
30
19'
19
28
15
27
35

LOW COST ACCUMULATOR DEVICE

BACKGROUND OF THE INVENTION

1. Field of the Invention

The present invention is in the field of accumulator devices and is directed more particularly to a hydraulic accumulator device of the type used for pulsation dampening and energy storage in hydraulic systems and the like.

2. The Prior Art

The use of accumulators for energy storage and pulsation dampening is today common place. A multiplicity of forms of hydraulic accumulators have heretofore been employed to satisfy the numerous industrial requirements therefor.

Typically, a hydraulic accumulator device includes a shell or pressure vessel having an oil port at one end and a gas charging port at the other. The oil port is provided with a nipple fixture or like connector enabling the same to be connected to the oil line of a hydraulic system. A bladder of elastomeric material is mounted within the pressure vessel and divides the vessel into two discrete chambers namely a chamber connected with the oil port and a chamber in communication with the gas charging port.

Examples of known fluid pressure accumulators may be found in U.S. Pat. Nos. 3,195,577 of July 20, 1965, 3,211,348 of Oct. 12, 1965 and 3,256,911 of June 21, 1966.

While the accumulator devices of the prior art as represented by the above noted patents provide effective energy storage and dampening structures, the costliness of such structures have prevented their wide spread use in mass produced environments, such as automobiles, wherein large competitive advantages are derived from even small cost reductions. More particularly, the pressure vessel components of the prior art devices, which form a principal element of the cost of the devices and which heretofore have been formed by forging, casting or spinning operations, have mandated a high initial cost factor for the accumulator. A further cost increasing factor has been the complexity of the accumulators of the prior art and the complex methods required for their assembly. More particularly, it is frequently necessary to utilize welding steps both to mount internal components within the accumulator and to complete the formation of the pressure vessel per se which is often fabricated of separate halves which must be connected.

SUMMARY OF THE INVENTION

The present invention is directed to a low cost hydraulic accumulator device characterized in that the shell or pressure vessel is integrally formed of a single blank of metal which, after preliminary forming operations, is hydraulically distended to assume a spherical configuration, at least in the reservoir components thereof. The device is further characterized in that the novel mounting assembly enables the bladder, the bladder support and a fixture for connecting the accumulator to a hydraulic line to be united with the pressure vessel or shell in a single simple forming operation whereby a leakproof connection is effected. The assembly operation lends itself to mass production techniques since the novel construction of the components automatically assures that the metal forming operation which integrates the pressure vessel casing and fixture provides just sufficient pressure on the bladder rim to assure a leakproof connection without damaging the bladder.

More particularly, in accordance with the present invention there is provided a shell or pressure vessel, the reservoir component of which is preferably formed by hydraulic distortion of a metal shell or blank to the desired spherical configuration. The spherical configuration provides the greatest possible burst resistant strength with a given metal thickness and the hydraulic forming operation minimizes the possibility of the existance of areas of stress concentration within the shell.

The shell includes a neck portion adapted to retain a casing defining a support for a bladder and a fixture for connection to a hydraulic line. The bladder includes a thickened rim portion which is sandwiched between portions of the neck of the shell and portions of a flange extending from the casing. The neck portion is so configured that when the open mouth of the neck portion of the shell is spun or otherwise formed over the fixture, the rim of the bladder is compressed to an optimum degree independent of the spinning force applied, whereby the vessel, the bladder, the casing and the fixture are reliably united into a leakproof unit.

Accordingly, it is an object of the present invention to provide a low cost hydraulic accumulator device. A further object of the invention is the provision of a device of the type described wherein the reservoir of the pressure shell is spherical in conformation and is formed by a hydraulic distortion process. A further object of the invention is the provision of a device of the type described which includes a wide mouth bladder portion facilitating fabrication of the bladder, the mouth of the bladder providing a retainer rim which is reliably connected to the pressure vessel and remaining components of the accumulator by a simple spinning or like metal deforming operation.

In order more fully to describe the invention and illustrate its use reference is made to the drawing which comprises a vertical sectional view through the accumulator device in accordance with the invention.

Referring now to the drawing the accumulator device includes a pressure vessel 10 having a generally spherical reservoir portion 11 and a neck portion 12. The other components of the accumulator include a casing 13, a bladder member 14 and an attachment fixture 15.

Optionally, but preferably, the pressure vessel 10 is fabricated by hydraulically outwardly expanding a metal shell or blank after preliminary conventional forming operations for shaping the neck, to form the spherical portion 11 by injecting or introducing under extreme pressures hydraulic fluids such as oil, water or the like through the neck portion 12 into the interior of the metal shell or blank so as to distend the shell or blank outwardly to cause them to assume the conformation of a surrounding mold or form. The procedures for forming the shell 10 are detailed in U.S. Pat. No. 2,688,297 of Sept. 7, 1954. Accordingly, further details of the procedure need not be here repeated.

Referring now in greater detail to the configurations of the neck portion 12 of the pressure vessel the same includes an outwardly radially directed horizontal flange 16 and depending rim portion 17, a radially outwardly directed stop shoulder and a skirt portion 19 which is initially generally cylindrical in configuration. The casing 13 includes a generally cylindrical or partially conical upstanding bladder support frame 20 having a rounded upper portion 21. The support portion 20 of the casing is provided with a multiplicity of radially directed perforations 22, the casing adjacent its base 23 being provided with a radially directed flange 24.

The bladder member 14, which is widest adjacent its base 25, includes a thickened rim portion 26. As will be seen from the inspection of the figure, the wall thickness of the bladder 14 reduces progressively at distances further from the base 25 of the bladder, whereby the degree of stretching upon inflation is greater at portions of the bladder remote from the base 25.

The accumulator includes a mounting fixture 15 including a threaded neck 27 or like coupling adapted to permit attachment to a hydraulic line. The enlarged base portion 28 of the fixture 15 includes an upwardly facing surface portion 29 having formed therein a annular recess 30 within which is disposed an O-ring or gasket 31.

The device is assembled by sleeving the bladder 14 over the upstanding portion 20 of the casing 13 and inserting the composite into the interior of the pressure vessel 10 through the neck portion 12 thereof. Thereafter the fixture 15 is inserted through the open mouth 19 in such manner that the upper surface 29 of the fixture engages against the downwardly directed surface 33 of the flange 24 of the casing 13.

With the parts thus positioned the skirt portion 19 may be deformed inwardly from the dot and dash position of the figure to the solid line position 19' of the figure. Such deformation, which may advantageously be effected by a spinning operation, forces the upper surface 32 of the fixture tightly against the undersurface 34 of the flange of the casing and at the same time forces the upper surface of the flange against the stop shoulder 18 of the vessel. The noted compressive action in addition to axially compressing the O-ring, tightly clamps the rim portion 26 of the bladder 14 between the flange 16 of the pressure vessel and the upper surface of the flange of the casing. It will be recognized that upward movement of the casing is limited by engagement of the flange of the casing against stop shoulder 18. In this manner the degree or extent of compression which may be effected against the rim 26 of the bladder, is controlled and is essentially independent of the force with which the elements 19 bear against the undersurface of the fixture 15.

As is conventional the fixture 15 includes a vertically directed bore 35 providing a port or passage for oil to the interior of the accumulator. Prior to use the gas chamber C of the accumulator is charged through gas port 36 which after charging, may be sealed by a valve or by a plug member 37.

It will thus be perceived that the bladder 14 divides the interior of the vessel into two chamber namely the previously described gas chamber C and the chamber C' located within the bladder member 14.

Preferably the accumulator of the instant invention is to be used in conjunction with low volume applications wherein the amount of hydraulic fluid entering the interior of the chamber C' through the oil port 35 will be insufficient to expand the bladder beyond about the dotted line position thereof 14' whereby the bladder will never engage against the interior walls of the spherical reservoir portion 11 of the accumulator.

From the foregoing description it will be seen that there is described in accordance with the present invention an inexpensive and readily assembled accumulator device particularly suitable for mass production manufacture. The hydraulic formation method provides an inexpensive means for fabricating a pressure vessel which is stress free and which is spherical in configuration thereby providing the highest degree of burst resistance at low cost. The bladder device may be readily fabricated since the same tapers to a rim portion defining a widest dimension of the bladder whereby bladder molding and removal from the mold is simplified. Since the final assembly operation may be effected by a simple metal turning or spinning operation or the like, assembly costs are maintained at a minimum. The inherent construction of the device assures that the rim portion of the bladder will be compressed only to a desired degree.

As will be evident to a skilled worker in the art familiarized with the instant disclosure numerous variations in details of construction may be made to the disclosed embodiment without departing from the spirit of the invention. Accordingly, the invention is to be broadly construed within the scope of the appended claims.

The embodiments of the invention in which an exclusive property or privilege is claimed are defined as follows:

1. As a new article of manufacture a low cost light weight hydraulic accumulator device comprising a unitary metallic shell defining a pressure vessel, said shell including a spherical reservoir, a generally cylindrical neck portion extending from said reservoir, said neck portion including a radially outwardly extending flange, a rim extending downwardly from said flange in the direction of the axis of said neck portion, a stop shoulder extending radially from said rim portion, a rigid hollow generally cylindrical casing extending into said reservoir, said casing including throughgoing perforations, a radially directed flange on said casing having an upper surface engaging said stop shoulder and a lower surface, a mounting fixture including an oil port supported in said neck portion, said fixture having a downwardly facing base portion and an upper surface portion engaging said lower surface of said flange of said casing, inturned portions of said neck portion underlapping said base portion of said fixture to clampingly support said fixture and the flange of said casing between said stop shoulder and inturned portions, and a resilient distensable generally cylindrical elastomeric bladder member disposed over said casing and dividing said reservoir into two chambers, said bladder member having a thickened rim portion defining a mouth, said bladder including portions disposed in an annular space defined between said neck and said casing, said thickened rim portion being clamped in an axially compressed condition between said flange of said neck and said upper surface of said flange of said casing to thereby define a seal between said casing and said vessel at said neck portion.

2. An accumulator in accordance with claim 1 wherein an annular gasket member is interposed between the upper surface of said fixture and said lower surface of said flange of said casing, said gasket being compressed to define an annular seal area surrounding said oil port by said inturned portions.

3. An accumulator in accordance with claim 2 wherein said unitary metallic shell is formed by hydraulically outwardly expanding a metallic cup configuration against the configurations of a spherical surrounding cavity.

4. An accumulator in accordance with claim 1 wherein said rim of said bladder member is of a greater diameter than all portions of said casing but said flange.

* * * * *